(12) United States Patent
Park et al.

(10) Patent No.: US 8,148,022 B2
(45) Date of Patent: Apr. 3, 2012

(54) FUEL CELL SYSTEM HAVING A PLURALITY OF GAS/LIQUID SEPARATION UNITS

(75) Inventors: Jung-Kurn Park, Suwon-si (KR); Dong-Hyun Kim, Suwon-si (KR); Myeong-Ju Ha, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/352,877

(22) Filed: Jan. 13, 2009

(65) Prior Publication Data

US 2009/0191445 A1    Jul. 30, 2009

(30) Foreign Application Priority Data

Jan. 24, 2008    (KR) ......................... 10-2008-0007518

(51) Int. Cl.
*H01M 8/00* (2006.01)
*H01M 8/06* (2006.01)

(52) U.S. Cl. ......... 429/414; 429/408; 429/413; 429/415
(58) Field of Classification Search ............... 429/12–46
See application file for complete search history.

(56) References Cited

U.S. PATENT DOCUMENTS

| | | | |
|---|---|---|---|
| 6,265,093 B1 * | 7/2001 | Surampudi et al. | 429/13 |
| 6,727,016 B2 | 4/2004 | Bostaph et al. | |
| 6,942,718 B1 | 9/2005 | Schmidt | |
| 7,544,434 B2 | 6/2009 | Yamauchi et al. | |
| 7,759,013 B2 | 7/2010 | Lee et al. | |
| 2002/0192525 A1 | 12/2002 | Neutzler | |
| 2003/0148151 A1 | 8/2003 | Preidel | |

(Continued)

FOREIGN PATENT DOCUMENTS

CN     ZL 200910002980        10/2011

(Continued)

OTHER PUBLICATIONS

SIPO Office Action (with English translation) dated Sep. 20, 2010 from related Chinese Application No. 2009-10002980.8.

(Continued)

*Primary Examiner* — Barbara Gilliam
*Assistant Examiner* — Steven Scully
(74) *Attorney, Agent, or Firm* — Knobbe, Martens, Olson & Bear LLP

(57) ABSTRACT

A fuel cell system having an excellent orientation free performance by separating a fluid into a liquid and a gas without being affected by shaking and/or rotation of the fuel cell system includes a fuel cell main body, a first liquid/gas separation unit, and a buffer line. The fuel cell main body receives a fuel containing hydrogen and an oxidizing gas containing oxygen and generates electrical energy through an electrochemical reaction between the hydrogen and the oxygen. The first gas/liquid separation unit is installed on a first recycling line extending from an anode outlet of the fuel cell main body to separate a gas byproduct from unreacted fuel discharged through the anode outlet. The buffer line is fluidly connected to the first and second recycling lines to receive and mix the unreacted fuel and the liquid byproduct at a predetermined amount from the first and second recycling lines, and is further fluidly connected to a third recycling line extending toward an anode inlet of the fuel cell main body to direct the unreacted fuel and the liquid byproduct into the fuel cell main body through the anode inlet.

11 Claims, 7 Drawing Sheets

U.S. PATENT DOCUMENTS

| | | | |
|---|---|---|---|
| 2004/0062980 A1* | 4/2004 | Ren et al. | 429/39 |
| 2005/0147854 A1* | 7/2005 | Sone et al. | 429/13 |
| 2006/0141338 A1 | 6/2006 | Wang | |
| 2007/0087234 A1 | 4/2007 | Wang | |
| 2007/0099061 A1* | 5/2007 | Na et al. | 429/38 |
| 2007/0202380 A1 | 8/2007 | Larrain | |
| 2008/0088273 A1* | 4/2008 | Shu et al. | 320/101 |
| 2008/0233437 A1 | 9/2008 | Muramatsu et al. | |

FOREIGN PATENT DOCUMENTS

| | | |
|---|---|---|
| CN | ZL 200910002980.8 | 10/2011 |
| EP | 1 691 436 A | 8/2006 |
| EP | 1 819 007 A | 8/2007 |
| JP | 2003-297401 A | 10/2003 |
| JP | 2004-507050 A | 3/2004 |
| JP | 2005-527063 A | 9/2005 |
| JP | 2006-4680 A | 1/2006 |
| JP | 2006-4785 A | 1/2006 |
| JP | 2006-173127 A | 6/2006 |

OTHER PUBLICATIONS

JPO Office Action (Japanese only) in JP 2008-200534, which is related to the present application.

Communication pursuant to Article 94(3) EPC in 09 151 067.7-1227, which is related to the present application.

Communication pursuant to Article 94(3) EPC in 09 151 067.7-1227, which is related to the present application.

* cited by examiner

FUEL CELL SYSTEM HAVING A PLURALITY OF GAS/LIQUID SEPARATION UNITS

CROSS-REFERENCE TO RELATED APPLICATION

This application claims priority to and the benefit of Korean Patent Application No. 10-2008-0007518, filed in the Korean Intellectual Property Office on Jan. 24, 2008, the entire content of which is incorporated herein by reference.

BACKGROUND

1. Technical Field

The present disclosure relates to a fuel cell system and, more particularly, to a fuel cell system that is designed to more effectively recycle moisture contained in fluid circulating in the fuel cell system and with orientation free functionality.

2. Description of the Related Art

Fuel cell systems are designed to generate electrical energy through an electrochemical reaction between hydrogen and oxygen. Fuel cells are classified according to fuel used into a variety of types, such as polymer electrolyte membrane fuel cells (PEMFCs), direct methanol fuel cells (DMFCs), and the like.

The PEMFCs use a hydrogen ion exchange polymer membrane as an electrolyte membrane. A fuel containing the hydrogen to electrochemically reacts with an oxidizing gas containing the oxygen therein, thereby continuously generating electrical energy and heat. The PEMFCs typically exhibit excellent output characteristics compared with other types of fuel cells, and have lower operational temperatures. In addition, the PEMFCs start and respond quickly relative to other types of fuel cells. Fuel cell systems using the PEMFC have been used in a variety of applications, such as portable power sources or battery-alternative power sources. The fuel cell systems are generally designed to supply the oxidizing gas and fuel to each fuel cell stack.

In DMFCs, a liquefied fuel such as methanol is directly supplied to each fuel cell stack without using a fuel reformer. The DMFCs receive the liquefied fuel and air, and generate electrical energy through an oxidation reaction of the fuel and a reduction reaction of the oxidizing gas therein. Fuel cell systems using DMFCs typically have relatively simple structures, and thus have been used as portable power sources and small-sized power sources.

In the above-described fuel cell systems, after the fuel electrochemically reacts with the oxidizing gas, unreacted fuel and carbon dioxide ($CO_2$) are discharged through an anode outlet, and unreacted oxidizing gas and water are discharged through a cathode outlet. In order to recycle the unreacted fuel, the carbon dioxide is separately discharged and the unreacted fuel is recycled to the fuel cell stack. Further, the unreacted oxidizing gas is separately discharged and the water (moisture) generated by the electrochemical reaction is mixed with the unreacted fuel and supplied to the fuel cell stack.

In the fuel cell system, the moisture generated by the electrochemical reaction is discharged through the cathode outlet mixed with the unreacted oxidizing gas. Therefore, in order to recycle the water (moisture), a typical fuel cell system includes a fluid recycling apparatus for separating the moisture from the oxidizing gas. The fluid recycling apparatus cools the unreacted oxidizing gas discharged from the fuel cell stack to a predetermined temperature or less to condense the moisture contained in the oxidizing gas into liquid water so that the moisture and the oxidizing gas can be separated from each other by gravity.

When a fuel cell system having, for example, a DMFC is used as a portable or small-sized power source, the fluid recycling apparatus may shake or rotate. As a result, the water separated from the unreacted oxidizing gas may remix with the unreacted oxidizing gas, or leak out of the fuel cell system. This type of problem is generally expressed as "a low orientation free performance." That is, since the typical fuel cell system has a low orientation free performance, the power efficiency of the typical fuel cell system is reduced.

SUMMARY OF THE INVENTION

Exemplary embodiments of the present disclosure provide a fuel cell system that is designed to separate fluid, which is discharged from a fuel cell main body after being used for an electrochemical reaction, into a liquefied fluid and a gaseous fluid.

Exemplary embodiments of the present disclosure also provide a fuel cell system having an excellent orientation free performance, which separates a fluid into a liquid and a gas without being affected by shaking and rotation of the fuel cell system.

Some embodiments provide a fuel cell system comprising a fuel cell stack; a first gas/liquid separation unit; a second gas/liquid separation unit; and a buffer line. The fuel cell stack comprises an anode inlet through with fuel is supplied, an anode outlet through which spent and unreacted fuel is discharged, a cathode inlet through which an oxidant is supplied, and a cathode outlet through which unreacted oxidant and water vapor are discharged. The anode outlet is fluidly connected to an inlet of the first gas/liquid separation unit where unreacted fuel is separated from carbon dioxide. The cathode outlet is fluidly connected to an inlet of the second gas/liquid separation unit where liquid water is separated from gas. Outlets of the first and second gas/liquid separation units are fluidly connected to the buffer line. An outlet of the buffer line is fluidly connected to the anode inlet of the fuel cell stack. In some embodiments, the buffer line comprises a serpentine or convoluted tube, which is dimensioned to fit within a compact volume. The volume of the buffer line is selected according to the throughput of the fuel cell stack to contain the volume of unreacted fuel and water exhausted by the fuel cell stack. Embodiments of the fuel cell system exhibit orientation free operation.

According to an exemplary embodiment of the present disclosure, a fuel cell system includes a fuel cell main body, a first liquid/gas separation unit, and a buffer line. The fuel cell main body receives a fuel containing hydrogen and an oxidizing gas containing oxygen, and generates electrical energy through an electrochemical reaction between the hydrogen and the oxygen. The first gas/liquid separation unit is installed on a first recycling line extending from an anode outlet of the fuel cell main body to separate a gas byproduct from unreacted fuel discharged through the anode outlet. The second gas/liquid separation unit is installed on a second recycling line extending from a cathode outlet of the fuel cell main body to separate a liquid byproduct from unreacted oxidizing gas discharged through the cathode outlet. The buffer line is connected to the first and second recycling lines to receive and mix the unreacted fuel and the liquid byproduct at a predetermined amount from the first and second recycling lines, and is further connected to a third recycling line extending toward an anode inlet of the fuel cell main body to direct the unreacted fuel and the liquid byproduct into the fuel cell main body through the anode inlet.

The buffer line may be bent in a serpentine pattern and may be compactly disposed in a predetermined space.

The fuel cell system may further include a plurality of liquid detecting sensors that are installed on the buffer line to detect if liquefied fluid exists.

The first gas/liquid separation unit may include a hydrophobic membrane for separating the gas byproduct from the unreacted fuel. The gas byproduct may be carbon dioxide.

The fuel cell system may further include a cooler that is installed on the first recycling line to cool a mixture of the unreacted fuel and the gas byproduct to a predetermined temperature. The cooler may be disposed between the fuel cell main body and the first gas/liquid separation unit The second gas/liquid separation unit may include a hydrophobic membrane for separating the liquid byproduct from the unreacted oxidizing gas. The liquid byproduct may be water.

The fuel cell system may further include a condenser that is installed on the second recycling line between the fuel cell main body and the second gas/liquid separation unit to condense a mixture of the unreacted oxidizing gas and the liquid byproduct to a predetermined pressure.

The fuel cell system may further include a plurality of hydrophobic membranes disposed on the buffer line at predetermined intervals.

The fuel cell system may further include a fluid pump that is installed on the third recycling line to supply a mixture of the unreacted fuel and the liquid byproduct to the fuel cell main body under a predetermined pressure.

The fuel cell system may further include a hydrophilic membrane installed on the third recycling line.

The buffer line may be formed of an elastic material with a variable volume.

The fuel cell system may further include a fuel supply unit for supplying the fuel containing the hydrogen to the fuel cell main body and an oxidizing gas supply unit for supplying the oxidizing gas containing the oxygen to the fuel cell main body. The fuel supply unit may be connected to the buffer line so that the fuel containing the hydrogen is introduced into the buffer line.

Some embodiments provide a fuel cell system comprising: a fuel cell main body configured for receiving a hydrogen-containing fuel, and configured for receiving an oxidizing gas containing oxygen, and configured for generating electrical energy through an electrochemical reaction between the hydrogen and the oxygen; a first gas/liquid separation unit installed on a first recycling line extending from an anode outlet of the fuel cell main body, wherein the first gas/liquid separation unit is configured to separate a gas byproduct from unreacted fuel discharged through the anode outlet; a second gas/liquid separation unit installed on a second recycling line extending from a cathode outlet of the fuel cell main body, wherein the first gas/liquid separation unit is configured to separate a liquid byproduct from unreacted oxidizing gas discharged through the cathode outlet; and a buffer line fluidly connected to the first and second recycling lines, configured to receive and mix unreacted fuel and liquid byproduct from the first and second recycling lines, and fluidly connected to a third recycling line fluidly connected to an anode inlet of the fuel cell main body, configured to direct the unreacted fuel and the liquid byproduct from the buffer line into the fuel cell main body into the anode inlet.

In some embodiments, the buffer line comprises a serpentine portion and is compactly disposed in a predetermined space.

Some embodiments further comprise a plurality of liquid detecting sensors installed on the buffer line.

In some embodiments, the first gas/liquid separation unit comprises a hydrophobic membrane configured for separating the gas byproduct from the unreacted fuel. In some embodiments, the gas byproduct comprises carbon dioxide.

Some embodiments further comprise a cooler installed on the first recycling line between the fuel cell main body and the first gas/liquid separation unit, wherein the cooler is configured to cool a mixture of the unreacted fuel and the gas byproduct to a predetermined temperature.

In some embodiments, the second gas/liquid separation unit comprises a hydrophobic membrane configured for separating the liquid byproduct from the unreacted oxidizing gas. In some embodiments, the liquid byproduct comprises water.

Some embodiments further comprise a condenser installed on the second recycling line between the fuel cell main body and the second gas/liquid separation unit, wherein the condenser is configured to condense a liquid byproduct from a mixture of the unreacted oxidizing gas at a predetermined pressure.

Some embodiments further comprise a plurality of hydrophobic membranes disposed on the buffer line at predetermined intervals.

Some embodiments further comprise a fluid pump installed on the third recycling line, configured to supply a mixture of the unreacted fuel and the liquid byproduct to the fuel cell main body at a predetermined pressure.

Some embodiments further comprise a hydrophilic membrane installed on the third recycling line.

In some embodiments, the buffer line comprises a member with a variable volume comprising an elastic material.

Some embodiments further comprise a fuel supply unit configured for supplying the hydrogen-containing fuel to the fuel cell main body, and an oxidizing gas supply unit configured for supplying the oxidizing gas containing the oxygen to the fuel cell main body, wherein the fuel supply unit is fluidly connected to the buffer line, thereby supplying the hydrogen-containing fuel into the buffer line.

DETAILED DESCRIPTION OF CERTAIN EMBODIMENTS

Certain embodiments will be described more fully hereinafter with reference to the accompanying drawings, in which exemplary embodiments are shown. As those skilled in the art would realize, the described embodiments may be modified in various different ways, all without departing from the spirit or scope of the present disclosure.

Figure 1:
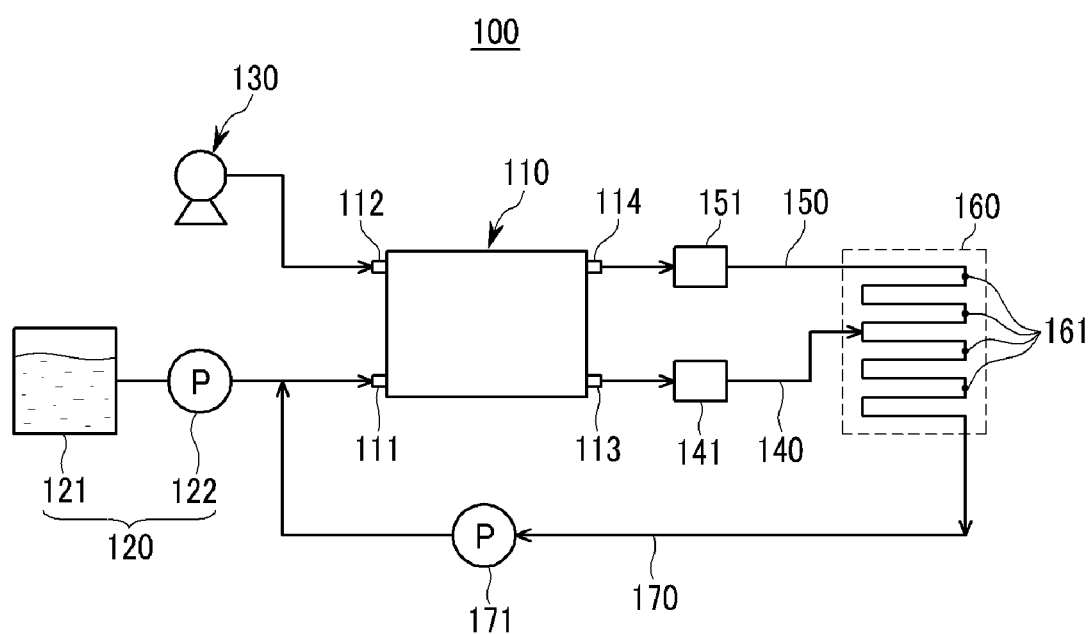
FIG. 1 is a schematic diagram of a fuel cell system according to a first exemplary embodiment of the present disclosure.

FIG. 1 is a schematic diagram of a fuel cell system 100 according to a first exemplary embodiment of the present disclosure.

As shown in FIG. 1, a fuel cell system 100 of a first exemplary embodiment of the present disclosure is designed to separate fluid, which is discharged from a fuel cell main body 110 after being used for an electrochemical reaction, into liquid and gas, and to prevent the separated liquid and gas from leaking externally and remixing with each other.

The fuel cell main body 110 generates electrical energy through an electrochemical reaction between hydrogen and oxygen. The fuel cell main body 110 includes at least one unit cell that is a minimum unit for generating electrical energy. Generally, the fuel cell main body 110 is an aggregate of several or several tens of unit cells that are sequentially stacked. End plates (not shown) are respectively coupled to opposite ends of the aggregate of the fuel cell main body 110. A fuel cell main body 110 as described above is also referred to as "fuel cell stack."

A fuel supply unit 120 supplies fuel containing hydrogen to the fuel cell main body 110. The fuel may be a hydrocarbon-based fuel (e.g., LNG or LPG). Alternatively, pure hydrogen may be used as the fuel. The fuel supply unit 120 includes a fuel tank 121 for storing the fuel containing the hydrogen, and a first fuel pump 122 for supplying the fuel at a predetermined pressure. The fuel supply unit 20 may further include additional elements such as a fuel reformer in accordance with the type of fuel.

An oxidizing gas supply unit 130 supplies oxidizing gas containing oxygen to the fuel cell main body 110. Oxygen in the atmosphere may be used as the oxidizing gas. That is, the oxidizing gas supply unit 130 supplies the air from the atmosphere to the fuel cell main body 110 using a device such as an air pump.

The hydrogen-containing fuel is introduced into the fuel cell main body 110 through an anode inlet 111 of the fuel cell main body 110. After the fuel is used in the electrochemical reaction in the fuel cell main body 110, it is subsequently discharged out of the fuel cell main body 110 through an anode outlet 113 of the fuel cell main body 110. The fluid discharged through the anode outlet 113 of the fuel cell main body 110 includes unreacted fuel and carbon dioxide ($CO_2$) generated in the electrochemical reaction. In order to maximize usage of the hydrogen-containing fuel, the fuel cell system 100 recycles unreacted fuel to the fuel cell main body 110 through the anode inlet 111.

The air used as the oxidizing gas is introduced into the fuel cell main body 110 through a cathode inlet 112. After the air is used for the electrochemical reaction in the fuel cell main body 110, it is subsequently discharged through the cathode outlet 114 of the fuel cell main body 110. The fluid discharged through the cathode outlet 114 of the fuel cell main body 110 includes reacted air and moisture (water vapor) generated in the electrochemical reaction. The fuel cell system 100 recycles the moisture contained in the fluid after condensing the moisture contained in the fluid into liquid water. That is, the fuel cell system 100 mixes a liquefied byproduct such as water with the unreacted fuel and supplies the resulting mixture to the fuel cell main body 110 through the anode inlet 111.

Described in more detail, a first recycling line 140 extends from the anode outlet 113 of the fuel cell main body 110, and is fluidly connected to a buffer line 160. A first gas/liquid separation unit 141 having a hydrophobic membrane is installed on the first recycling line 140. The hydrophobic membrane is a thin film that does not absorb liquid such as water, but allows gas to selectively pass therethrough, thereby separating the liquid and gas from each other. That is, the first gas/liquid separation unit 141 uses the hydrophobic membrane to separate the carbon dioxide from the reacted fuel and discharges the separated carbon dioxide to the outside.

A second recycling line 150 extends from the cathode outlet 114 of the fuel cell main body 110 and is fluidly connected to the buffer line 160. A second gas/liquid separation unit 151 having a hydrophobic membrane is installed on the second recycling line 150. The second gas/liquid separation unit 151 uses the hydrophobic membrane to separate the unreacted air from the liquid byproduct such as water and discharges the separated unreacted air to the outside.

The buffer line 160 comprises a serpentine pipe line, which may be compactly disposed in a predetermined space. The buffer line 160 extends from the second recycling line 150, is fluidly connected to the first recycling line 140. The unreacted fuel is directed into the buffer line 160 through the first recycling line 140, and the liquid byproduct such as water is directed into the buffer line 160 through the second recycling line 150. Then, the unreacted fuel and the liquid byproduct are mixed with each other in the buffer line 160, which can be filled with a predetermined amount of fluid. Pressure from the oxidizing gas supply unit 130 and pressure generated when the unreacted air is separated in the second gas/liquid separation unit 151 drives water through the buffer line 160. The unreacted fuel from the first recycling line 140 is drawn into the buffer line 160 by a pressure difference generated as the liquid byproduct flows along the buffer line 160.

The buffer line 160 is fluidly connected to a third recycling line 170 extending toward the anode inlet 111 of the fuel cell main body 110. Then, the unreacted fuel and the liquid byproduct are directed from the buffer line 160 to the third recycling line 170 so that they can be introduced into the fuel cell main body 110 through the anode inlet 111.

In the embodiment described above, the fuel cell system 100 does not require a separate fuel tank present in typical fuel cell systems, instead, storing fuel in the buffer line 160. Because the buffer line 160 is bent in the serpentine pattern, it occupies a minimum space and stores a predetermined amount of the unreacted fuel and liquid byproduct, that is, water, therein. In the fuel cell system 100, since the gas is eliminated by the first and second liquid/gas separation units 141 and 151, the buffer line 160 is filled with the unreacted fuel and the liquid byproduct. Therefore, even when the fuel cell system 100 is shaken or rotated, the liquefied fluid does not leak out and does not mix with the gas. That is, the fuel cell system 100 has orientation free performance. At this point, the amount of the unreacted fuel and liquid byproduct discharge from the fuel cell main body 110 varies in accordance with an output performance of the fuel cell main body 110. A length of the buffer line 160 provides a predetermined volume taking into account the output performance of the fuel cell main body 110.

In order to maintain the orientation free performance, the buffer line 160 is uniformly filled with a predetermined amount of the unreacted fuel and liquid byproduct. The fuel cell system 100 includes a plurality of liquid detecting sensors 161 that are arranged on the buffer line 160 at predetermined intervals. The liquid detecting sensors 161 detect if the liquefied fluid exists in the buffer line 160 and generate different signals. Sensors that detect the liquefied fluid by resistance or refractive index may be used as the liquid detecting sensors 161. The liquid detecting sensors 161 are designed to detect the liquefied fluid even when the fuel cell system 100 is shaken or rotated. That is, the liquid detecting sensors 161 also have orientation free performance. Each of the liquid detecting sensors 161 detects if the unreacted fuel and the liquid byproduct exist at a predetermined location, and further detects if a predetermined amount of the unreacted fuel and liquid byproduct is maintained in the buffer line 160.

The fuel cell system 100 further includes a fluid pump 171 installed on the third recycling line 170. The fluid pump 171 pumps the unreacted fuel and the liquid mixed with the liquid byproduct at a predetermined pressure to the anode inlet 111.

Figure 2:
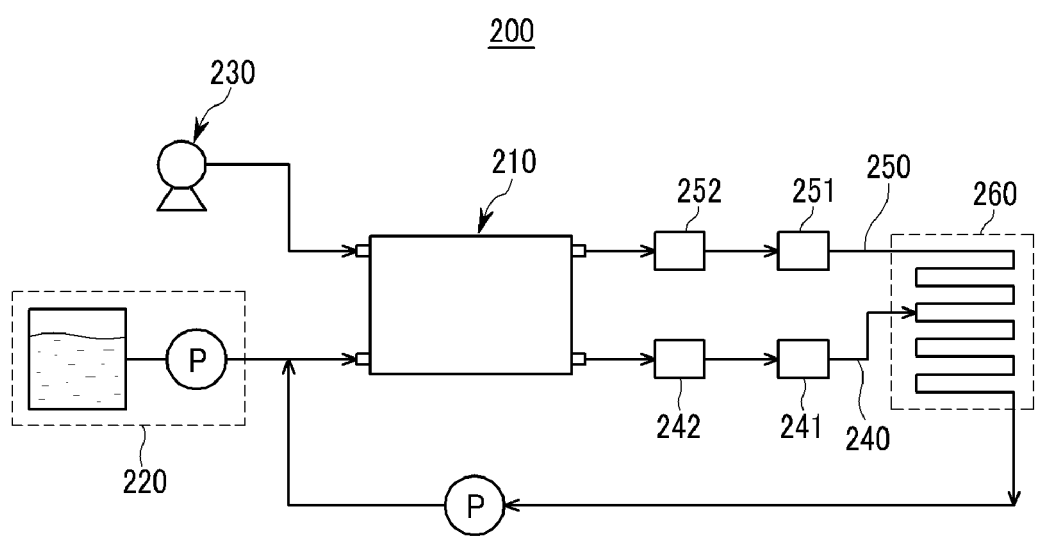
FIG. 2 is a schematic diagram of a fuel cell system according to a second exemplary embodiment of the present disclosure.

FIG. 2 is a schematic diagram of a fuel cell system 200 according to a second exemplary embodiment of the present disclosure.

As shown in FIG. 2, like the fuel cell system of FIG. 1, a fuel cell system in accordance with a second exemplary embodiment of the present disclosure includes a fuel cell main body 210, a fuel supply unit 220, and an oxidizing gas supply unit 230.

According to a feature of the fuel cell system 200 of FIG. 2, a cooler 242 is installed on a first recycling line 240. That is, the cooler 242 is installed between the fuel cell main body 210 and a first gas/liquid separation unit 241 to cool fluid containing unreacted fuel and carbon dioxide to a predetermined temperature. Then, the unreacted fuel is more quickly liquefied and thus the first gas/liquid separation unit 241 can more effectively separate the carbon dioxide gas byproduct from the unreacted fuel.

The fuel cell system 200 further includes a condenser 252 installed on a second recycling line 250. That is, the condenser 252 is installed between the fuel cell main body 210 and a second gas/liquid separation unit 251 to condense a mixture of the unreacted air and water vapor to predetermined pressure. The condenser 252 can more effectively condense the water vapor into liquid water by varying saturated vapor pressure. The water that is the liquid byproduct is mixed with the unreacted fuel from the first recycling line 240 in a buffer line 260.

Figure 3:
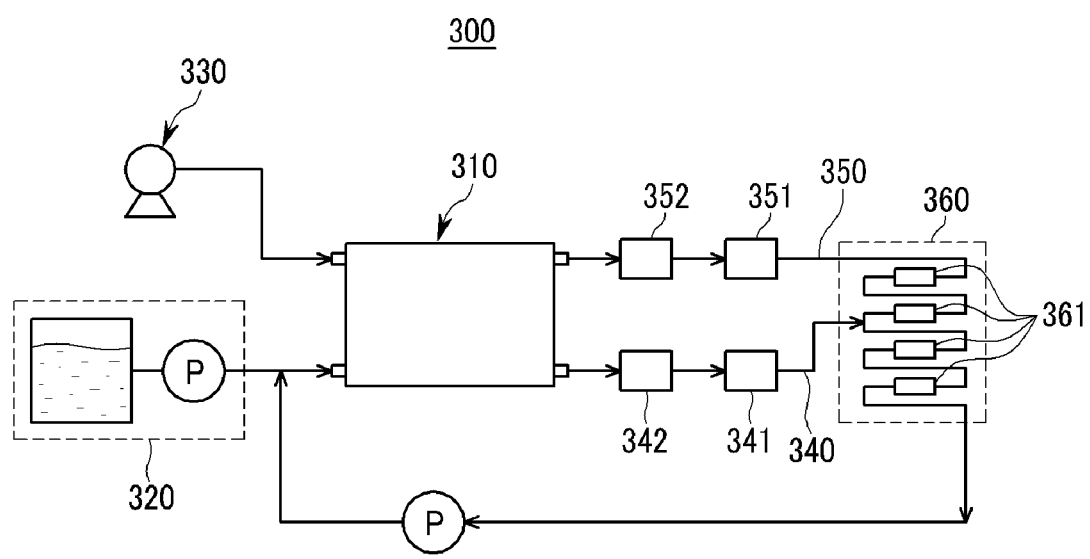
FIG. 3 is a schematic diagram of a fuel cell system according to a third exemplary embodiment of the present disclosure.

FIG. 3 is a schematic diagram of a fuel cell system 300 according to a third exemplary embodiment of the present disclosure.

As shown in FIG. 3, like the fuel cell system 200 of FIG. 2, a fuel cell system 300 in accordance with a third exemplary embodiment of the present disclosure includes a fuel cell main body 310, a fuel supply unit 320, and an oxidizing gas supply unit 330. A cooler 342 and a first gas/liquid separation unit 341 are installed on a first recycling line 340. Therefore, the fuel cell system 300 can more effectively separate the carbon dioxide gas byproduct from unreacted fuel. A second gas/liquid separation unit 351 and a condenser 352 are installed on a second recycling line 350. Therefore, unreacted air and water can be more effectively separated from each other.

Particularly, one or a plurality of hydrophobic membranes 361 is installed in the buffer line 360 at predetermined intervals. A gaseous fluid such as carbon dioxide or unreacted air may not be fully separated in the first and second gas/liquid separation units 341 and 351. Therefore, the buffer line 360 may contain some gas. The hydrophobic membranes 361 installed in the buffer line 360 effectively separate even small quantities of gas such as carbon dioxide or unreacted air. The buffer line 360 is serpentine, and thus the hydrophobic membranes 361 can be more effectively installed in the buffer line 360 at predetermined intervals.

Figure 4:
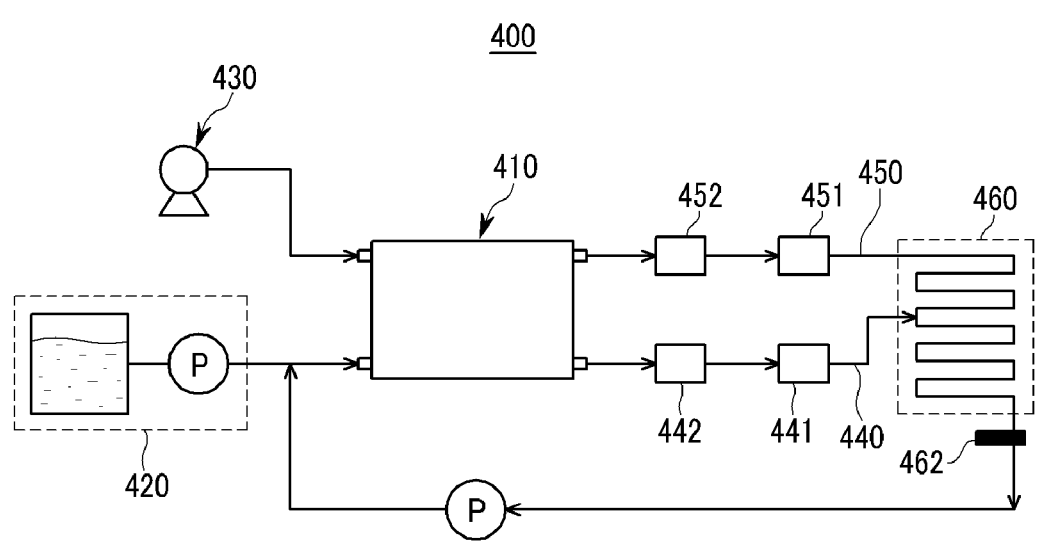
FIG. 4 is a schematic diagram of a fuel cell system according to a fourth exemplary embodiment of the present disclosure.

FIG. 4 is a schematic diagram of a fuel cell system 400 according to a fourth exemplary embodiment of the present disclosure.

As shown in FIG. 4, like the fuel cell system of FIG. 2, a fuel cell system 400 in accordance with a fourth exemplary embodiment of the present disclosure includes a fuel cell main body 410, a fuel supply unit 420, and an oxidizing gas supply unit 430. A cooler 442 and a first gas/liquid separation unit 441 are installed on a first recycling line 440. Therefore, the fuel cell system 400 can more effectively separate the carbon dioxide gas byproduct from unreacted fuel. A second gas/liquid separation unit 451 and a condenser 452 are installed on a second recycling line 450. Therefore, unreacted air and water can be more effectively separated from each other.

Particularly, a hydrophilic membrane 462 is installed in a third recycling line. The hydrophilic membrane 462 is a thin film having an affinity for a liquid byproduct such as water.

The unreacted fuel and the water can effectively flow toward the fuel cell main body 410 along a buffer line 460 and the third recycling line by air pressure applied by the oxidizing gas supply unit 430. However, when the fuel cell system 400 is used as a portable power source, the fuel cell system 400 may be turned over or rotated, and thus the operational condition of the fuel cell system 400 may frequently vary. When the fuel cell system 400 is turned over or rotated, the flow of unreacted fuel and water may reverse, that is, flow away from the fuel cell main body 410. Considering the above situation, the fuel cell system 400 is designed such that the unreacted fuel and water is temporarily stored in buffer line 460 by the hydrophilic membrane 462, which allows flow only in one direction.

Alternatively, the fuel cell system 400 may be designed to allow the unreacted fuel and the water to flow only in one direction in the third recycling line using a capillary phenomenon.

Figure 5:
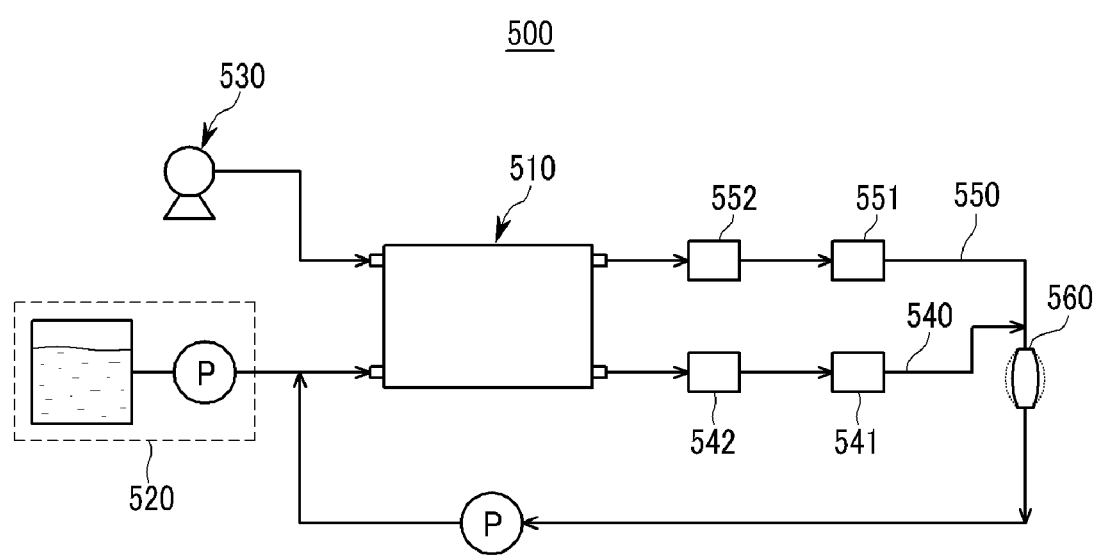
FIG. 5 is a schematic diagram of a fuel cell system according to a fifth exemplary embodiment of the present disclosure.

FIG. 5 is a schematic diagram of a fuel cell system 500 according to a fifth exemplary embodiment of the present disclosure.

As shown in FIG. 5, like the fuel cell system of FIG. 2, a fuel cell system 500 in accordance with a fifth exemplary embodiment of the present disclosure includes a fuel cell main body 510, a fuel supply unit 520, and an oxidizing gas supply unit 530. A cooler 542 and a first gas/liquid separation unit 541 are installed on a first recycling line 540. Therefore, the fuel cell system 500 can more effectively separate the carbon dioxide gas byproduct from unreacted fuel. A second gas/liquid separation unit 551 and a condenser 552 are installed on a second recycling line 550. Therefore, unreacted air and water can be more effectively separated from each other.

Particularly, a variable member 560 is disposed at a specific location of the second recycling line 550. The variable member 560 comprises an elastic material with a volume that may vary. The first recycling line 540 is fluidly connected to the second recycling line 550 upstream of the variable member 560. Then, the unreacted fuel and the water may be mixed with each other in the variable member 560 within a predetermined volume range. As described above, the fuel cell system 500 of the present exemplary embodiment can identically realize the orientation free performance using the variable member 560 instead of using the buffer lines 160, 260, 360, and 460 of FIGS. 1 through 4.

Figure 6:
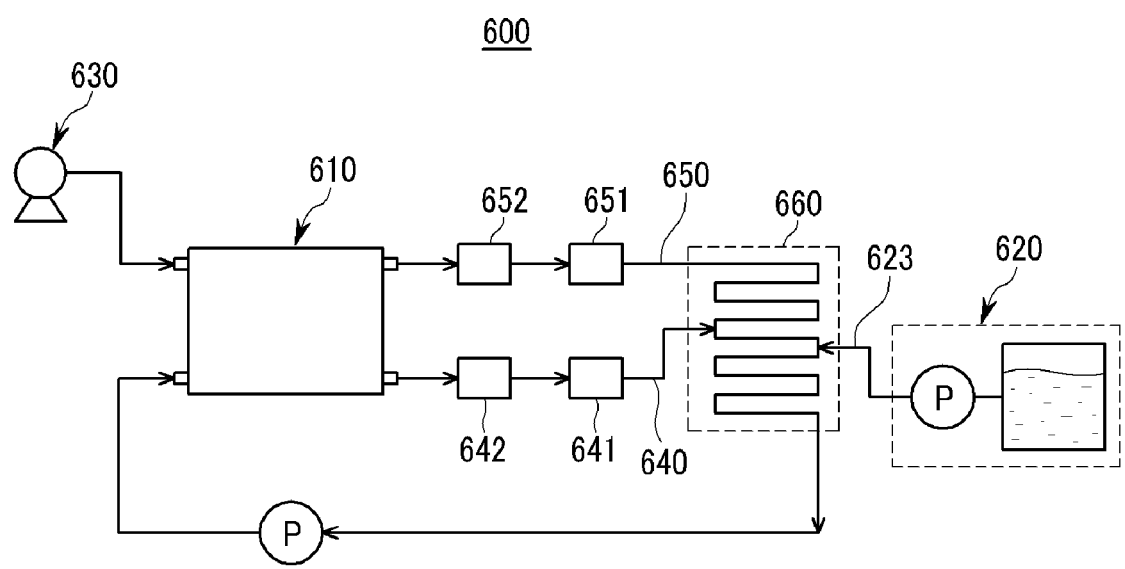
FIG. 6 is a schematic diagram of a fuel cell system according to a sixth exemplary embodiment of the present disclosure.

FIG. 6 is a schematic diagram of a fuel cell system 600 according to a sixth exemplary embodiment of the present disclosure.

As shown in FIG. 6, like the fuel cell system of FIG. 2, a fuel cell system 600 in accordance with a fifth exemplary embodiment of the present disclosure includes a fuel cell main body 610, a fuel supply unit 620, and an oxidizing gas supply unit 630. A cooler 642 and a first gas/liquid separation unit 641 are installed on a first recycling line 640. Therefore, the fuel cell system 600 can more effectively separate the carbon dioxide gas byproduct from unreacted fuel. A second gas/liquid separation unit 651 and a condenser 652 are installed on a second recycling line 650. Therefore, unreacted air and water can be more effectively separated from each other.

According to a feature of the present exemplary embodiment, the fuel supply unit 620 is fluidly connected to a buffer line 660. In the present exemplary embodiment, the fuel supply unit 620 supplies the hydrogen-containing fuel to the buffer line 660 through a fuel supply line 623 as shown in FIG. 6. Then, unreacted from the fuel cell main body 610, the liquid water byproduct, and fuel supplied from the fuel supply unit 620 can be more effectively mixed with each other in the buffer line 660, and the resulting mixture directed into the fuel cell main body 610 through the anode inlet.

Figure 7:
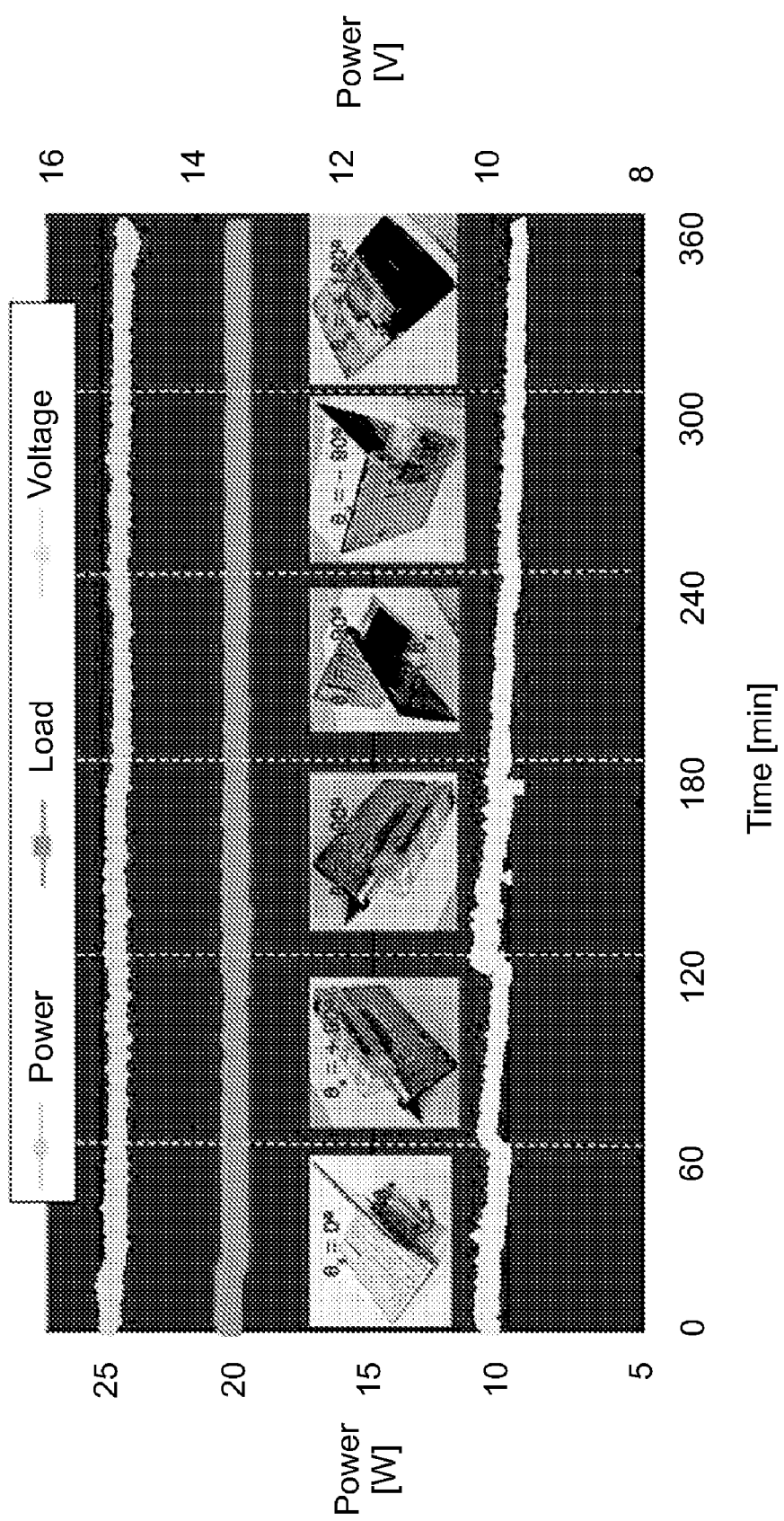
FIG. 7 is a graph illustrating orientation free test results of the fuel cell system when the fuel cell system of FIG. 1 is installed in a laptop computer as a power source.

FIG. 7 is a graph illustrating orientation free test results of a laptop computer with the fuel cell system of FIG. 1 installed as a power source.

In the test, power (W), voltage (V), and outer load of the fuel cell system of FIG. 1 were measured. A location coordinate axis of the laptop computer was varied by rotating the laptop computer every hour (60 minutes). As shown in the graph of FIG. 7, the power W, voltage V, and outer load were uniformly maintained without significant change with orientation.

The results show that, even when the fuel cell system 100 is used as a portable power source of a mobile device, the liquid byproduct such as water does not leak out of the fuel cell system 100 and the power output of the fuel cell system is not deteriorated. That is, the fuel cell systems of the exemplary embodiments have excellent orientation free performance.

According to the present disclosure, the fuel cell system includes a buffer line that separates fluid discharged from the fuel cell main body into liquid and gas, prevents the liquid and gas from leaking, and prevents the liquid and gas from remixing with each other. Therefore, the orientation free performance of the fuel cell system can be improved and thus the fuel cell system can be widely used as a portable power source or a small power source.

While certain embodiments been described in connection with what is presently considered to be practical exemplary embodiments, it is to be understood that the disclosure is not limited thereto, but, on the contrary, is intended to cover various modifications and equivalent arrangements included within the spirit and scope of the appended claims.

What is claimed is:

1. A fuel cell system, comprising:
a fuel cell main body configured for receiving a hydrogen-containing fuel, and configured for receiving an oxidizing gas containing oxygen, and configured for generating electrical energy through an electrochemical reaction between the hydrogen and the oxygen;
a first gas/liquid separation unit installed on a first recycling line extending from an anode outlet of the fuel cell main body, wherein the first gas/liquid separation unit is configured to separate a gas byproduct from unreacted fuel discharged through the anode outlet;
a second gas/liquid separation unit installed on a second recycling line extending from a cathode outlet of the fuel cell main body, wherein the first gas/liquid separation unit is configured to separate a liquid byproduct from unreacted oxidizing gas discharged through the cathode outlet;
a buffer line comprising a serpentine portion in fluid communication with the first and second recycling lines, wherein the buffer line is compactly disposed in a predetermined space, wherein the buffer line is configured to receive and mix unreacted fuel and liquid byproduct from the first and second recycling lines;
a plurality of hydrophobic membranes disposed on the buffer line at predetermined intervals configured to separate gas byproduct or oxidizing gas from a mixture of unreacted fuel and liquid byproduct; and
a third recycling line in fluid communication with the buffer line, wherein the third recycling line is in fluid communication with an anode inlet of the fuel cell main body, and wherein the third recycling line is configured to direct the unreacted fuel and the liquid byproduct from the buffer line into the fuel cell main body into the anode inlet.

2. The fuel cell system of claim 1 further comprising a plurality of liquid detecting sensors installed on the buffer line.

3. The fuel cell system of claim 1, wherein the first gas/liquid separation unit comprises a hydrophobic membrane, and wherein the gas byproduct comprises carbon dioxide.

4. The fuel cell system of claim 1 further comprising a cooler installed on the first recycling line between the fuel cell main body and the first gas/liquid separation unit.

5. The fuel cell system of claim 1, wherein the second gas/liquid separation unit comprises a hydrophobic membrane configured for separating the liquid byproduct from the unreacted oxidizing gas.

6. The fuel cell system of claim 5, wherein the liquid byproduct comprises water.

7. The fuel cell system of claim 1 further comprising a condenser installed on the second recycling line between the fuel cell main body and the second gas/liquid separation unit.

8. The fuel cell system of claim 1 further comprising a fluid pump installed on the third recycling line.

9. The fuel cell system of claim 1 further comprising a hydrophilic membrane installed on the third recycling line.

10. The fuel cell system of claim 1 further comprising:
a fuel supply unit configured for supplying the hydrogen-containing fuel to the fuel cell main body; and
an oxidizing gas supply unit configured for supplying the oxidizing gas containing the oxygen to the fuel cell main body,
wherein the fuel supply unit is in fluid communication with the buffer line, and
wherein the oxidizing gas supply unit is in fluid communication with the fuel cell main body.

11. A fuel cell system, comprising:
a fuel cell main body;
a first gas/liquid separation unit installed on a first recycling line extending from an anode outlet of the fuel cell main body, wherein the first gas/liquid separation unit comprises a hydrophobic membrane;
a second gas/liquid separation unit installed on a second recycling line extending from a cathode outlet of the fuel cell main body, wherein the second gas/liquid separation unit comprises a hydrophobic membrane;
a buffer line comprising a serpentine pipe compactly disposed in a predetermined space, wherein the buffer line is in fluid communication with the first and second recycling lines;
a plurality of hydrophobic membranes disposed on the buffer line at predetermined intervals configured to separate gas byproduct or oxidizing gas from a mixture of unreacted fuel and liquid byproduct; and
a third recycling line in fluid communication with the buffer line, wherein the third recycling line is in fluid communication with an anode inlet of the fuel cell main body, and wherein a hydrophilic membrane is installed on the third recycling line.

* * * * *